Patented Nov. 8, 1927.

1,648,213

UNITED STATES PATENT OFFICE.

LUDWIG BENDA, OF MAINKUR, NEAR FRANKFORT-ON-THE-MAIN, GERMANY, ASSIGNOR TO I. G. FARBENINDUSTRIE AKTIENGESELLSCHAFT, A CORPORATION OF GERMANY.

PROCESS FOR THE PRODUCTION OF STABLE, STERILIZABLE, COMPLEX AURO-SODIUM-THIOSULPHATE SOLUTIONS.

No Drawing. Application filed November 30, 1925, Serial No. 72,407, and in Germany January 27, 1925.

The complex compound $Na_3Au(S_2O_3)_2$,-$2H_2O$ described by Fordos & Gélis (Ann. de Chim. et de Phys. serie 3 vol. 13(1845) page 394 and following) decomposes when heated in the solid state as well as in solution, so that sterilization as required for application in the form of injections is not feasible.

I have found that by the addition of sodium thiosulphate solutions may be prepared which are stable and sterilizable and which, in contrast with the gold preparations hitherto employed in therapeutics, in addition possess the further advantage of relative non-toxicity. It has been proved by clinical experiments that in the case for instance of lupus and other types of tuberculosis the therapeutic doses do not call forth any harmful incidental effects.

*Example 1.*

10 g. $Na_3Au(S_2O_3)_2.2aq$ are finely mixed with 5 g. sodium thiosulphate, this mixture dissolved in 1000 cc. distilled water, filled in ampoules and sterilized for one hour at 100° C. The solution remains colorless and as clear as water, whereas a solution of $Na_3Au(S_2O_3)_2.2aq$ treated in the same way, is colored dark.

*Example 2.*

10 g. $Na_3Au(S_2O_3)_2.2aq$ are dissolved at ordinary temperature in 500 cc. distilled water, adding a solution of 5 g. sodium thiosulphate in 500 cc. distilled water, filling in ampoules and sterilizing for one hour at 100° C. The solution remains clear and unchanged, whereas a test portion without the addition of sodium thiosulphate is decomposed (precipitation of a brownish-black sediment after a passing reddish-violet coloration).

Having now particularly described and ascertained the nature of my said invention and in what manner the same is to be performed, I declare that what I claim is:

1. A process for the production of stable, sterilizable, complex auro-sodium thiosulphate solutions by mixing complex auro-sodium thiosulphate with sodium thiosulphate as solid substances and then dissolving.

2. A process for the production of stable, sterilizable, complex auro-sodium thiosulphate solutions by mixing complex auro-sodium thiosulphate and sodium thiosulphate in solutions.

3. As new products stable and sterilizable, complex auro-sodium thiosulphate solutions, being colorless, clear solutions which also remain invariably clear on sterilizing.

In witness whereof I have hereunto signed my name this 12th day of November, 1925.

LUDWIG BENDA.